(12) United States Patent
Aufdencamp

(10) Patent No.: US 11,046,192 B2
(45) Date of Patent: Jun. 29, 2021

(54) ELECTRIC VEHICLE ENERGY STORE WITH FUEL TANK FORM FACTOR AND MOUNTING CONFIGURATION

(71) Applicant: HYLIION INC., Cedar Park, TX (US)

(72) Inventor: Phil Aufdencamp, Austin, TX (US)

(73) Assignee: Hyliion Inc., Cedar Park, TX (US)

( * ) Notice: Subject to any disclaimer, the term of this patent is extended or adjusted under 35 U.S.C. 154(b) by 290 days.

(21) Appl. No.: 16/237,533

(22) Filed: Dec. 31, 2018

(65) Prior Publication Data

US 2019/0202312 A1   Jul. 4, 2019

Related U.S. Application Data

(60) Provisional application No. 62/612,575, filed on Dec. 31, 2017.

(51) Int. Cl.
*B60K 1/04* (2019.01)
*B60L 50/60* (2019.01)
(Continued)

(52) U.S. Cl.
CPC ............... *B60L 50/66* (2019.02); *B60K 6/28* (2013.01); *B60L 50/60* (2019.02); *B62D 59/04* (2013.01);
(Continued)

(58) Field of Classification Search
CPC ............. B60K 1/04; B60K 6/28; B62D 59/04
See application file for complete search history.

(56) References Cited

U.S. PATENT DOCUMENTS 4,013,300 A * 3/1977 Berger .................. B60K 15/00
                                              280/834
4,199,037 A    4/1980 White
(Continued)

FOREIGN PATENT DOCUMENTS

CA         2457216 A1    8/2004
WO    WO 2005012025 A1   2/2005
(Continued)

OTHER PUBLICATIONS

Zulkifli, S.A.: "Split-Parallel Through-the-Road Hybrid Electric Vehicle: Operation, Power Flow and Control Modes", 2015 IEEE Transportation Electrification Conference and Expo (ITEC), Jun. 17, 2015 (Jun. 17, 2015), pp. 107.
(Continued)

*Primary Examiner* — John D Walters
*Assistant Examiner* — James J Triggs
(74) *Attorney, Agent, or Firm* — Baker Botts L.L.P.

(57) ABSTRACT

An energy store tank assembly includes a tank adapted for mounting to a frame of a tractor-trailer vehicle by a mounting bracket. The mounting bracket is coupled to the frame, and the mounting bracket extends around, and in contact with, a circumference of the tank to secure the tank to the frame. The energy store tank assembly further includes an energy store disposed within the tank, the energy store configured to supply electrical power to the tractor-trailer vehicle in a first mode of operation and further configured to receive energy from the tractor-trailer vehicle in a second mode of operation. In some embodiments, the tank includes an electrical interface through which the energy store supplies the electrical power to the tractor-trailer vehicle in the first mode of operation and through which the energy store receives energy from the tractor-trailer vehicle in the second mode of operation.

20 Claims, 13 Drawing Sheets

(51) Int. Cl.
   *B60K 6/28* (2007.10)
   *B62D 59/04* (2006.01)
(52) U.S. Cl.
   CPC ... *B60L 2200/28* (2013.01); *B60Y 2200/1422* (2013.01)

(56) References Cited

U.S. PATENT DOCUMENTS

| | | | |
|---|---|---|---|
| 5,366,246 A * | 11/1994 | Chen | B60K 15/03 220/562 |
| 5,488,352 A | 1/1996 | Jasper | |
| 5,559,420 A | 9/1996 | Kohchi | |
| 6,390,215 B1 | 5/2002 | Kodama | |
| 6,516,925 B1 | 2/2003 | Napier | |
| 7,147,070 B2 | 12/2006 | Leclerc | |
| 7,338,335 B1 | 3/2008 | Messano | |
| 7,398,849 B2 * | 7/2008 | Yoshida | B60K 1/04 180/68.5 |
| 7,913,788 B1 * | 3/2011 | Bryer | B60K 15/063 180/68.5 |
| 8,122,989 B2 * | 2/2012 | Burchett | B60R 16/04 180/68.5 |
| 8,327,960 B2 | 12/2012 | Couture | |
| 8,627,908 B2 | 1/2014 | Wellborn | |
| 9,321,357 B2 | 4/2016 | Caldeira | |
| 9,457,666 B2 | 10/2016 | Caldeira | |
| 9,887,570 B2 | 2/2018 | Johnsen | |
| 9,937,819 B2 | 4/2018 | Healy | |
| 9,944,173 B2 * | 4/2018 | Ajisaka | B62D 25/20 |
| 9,948,136 B2 | 4/2018 | Doane | |
| 2002/0038730 A1 | 4/2002 | Bidwell | |
| 2002/0056579 A1 | 5/2002 | Cooper | |
| 2004/0002794 A1 | 1/2004 | Pillar | |
| 2005/0045058 A1 | 3/2005 | Donnelly | |
| 2005/0060079 A1 | 3/2005 | Phillips | |
| 2007/0193795 A1 | 8/2007 | Forsyth | |
| 2008/0169144 A1 | 7/2008 | DeGrave | |
| 2008/0174174 A1 | 7/2008 | Burns | |
| 2009/0223725 A1 | 9/2009 | Rodriguez | |
| 2010/0065344 A1 | 3/2010 | Collings | |
| 2010/0141201 A1 | 6/2010 | Littrell | |
| 2010/0224430 A1 | 9/2010 | Bennett, Sr. | |
| 2010/0252339 A1 | 10/2010 | Bibeau | |
| 2010/0282122 A1 | 11/2010 | Mai | |
| 2011/0042154 A1 | 2/2011 | Bartel | |
| 2011/0094807 A1 | 4/2011 | Pruitt | |
| 2011/0320078 A1 | 12/2011 | McGill | |
| 2012/0141841 A1 * | 6/2012 | Rich | H01M 10/613 429/9 |
| 2012/0167555 A1 | 7/2012 | Frazier | |
| 2013/0190998 A1 | 7/2013 | Polimeno | |
| 2013/0204501 A1 | 8/2013 | Keeney | |
| 2013/0338848 A1 | 12/2013 | Park | |
| 2014/0025245 A1 | 1/2014 | Fanourakis | |
| 2014/0116077 A1 | 5/2014 | Pierce et al. | |
| 2015/0204741 A1 | 7/2015 | Hagan | |
| 2015/0298680 A1 | 10/2015 | Matthews | |
| 2015/0298684 A1 | 10/2015 | Schwartz | |
| 2016/0014252 A1 | 1/2016 | Biderman | |
| 2016/0031435 A1 | 2/2016 | Gibson | |
| 2016/0061611 A1 | 3/2016 | Meyer et al. | |
| 2016/0137204 A1 | 5/2016 | Morselli | |
| 2016/0318421 A1 | 11/2016 | Healy | |
| 2018/0328324 A1 * | 11/2018 | Yaccarino | B60K 15/03519 |

FOREIGN PATENT DOCUMENTS

| | | |
|---|---|---|
| WO | WO 2015052567 | 4/2015 |
| WO | WO 2018064619 A2 | 4/2018 |

OTHER PUBLICATIONS

PCT International Search Report, Application No. PCT/US2017/054587, dated Apr. 20, 2018.
PCT International Search Report, Application No. PCT/US2018/018499, dated May 22, 2018.
European Search Report, Application No. 16789915.2, dated Jan. 8, 2018.
Karbowski, Sokolov, and Rousseau, "Vehicle Energy Management Optimisation through Digital Maps and Connectivity", 22nd ITS World Congress, ITS-1952, Bordeaux, France, Oct. 5-9, 2015.
Lin, Kang, Grizzle, and Peng, "Energy Management Strategy for a Parallel Hybrid Electric Truck", Proceedings of the American Control Conference, 2001, pp. 2878-2883, Digital Object Identifier: 10.1109/ACC.2001.946337.
Zulkifli, Mohd, Saad, and Aziz, "Operation and Control of Split-Parallel, Through-The-Road Hybrid Electric Vehicle With In-Wheel Motors", International Journal of Automotive and Mechanical Engineering, vol. 11, pp. 2793-2808, 2015, Digital Object Identifier: 10.15282/ijame.11.2015.54.0235.
Kural and Guvenc, "Predictive-Equivalent Consumption Minimization Strategy for Energy Management of a Parallel Hybrid Vehicle for Optimal Recuperation", Journal of Polytechnic, 18(3), pp. 113-124, 2015, Digital Object Identifier: 10.2339/2015.18.3, 113-124.
Skugor, Pavkovic, and Deur, "A Series-Parallel Hybrid Electric Vehicle Control Strategy Including Instantaneous Optimization of Equivalent Fuel Consumption", IEEE International Conference on Control Applications, pp. 310-316, 2012.
PCT International Search Report and Written Opinion, Application No. PCT/US2016/030482, dated Aug. 4, 2016.
Musardo, Rizzoni, and Staccia, "A-ECMS: An Adaptive Algorithm for Hybrid Electric Vehicle Energy Management", Proceedings of the 44th IEEE Conference on Decision and Control, 2005, pp. 1816-1823.
Paganelli, Delprat, Guerra, Rimaux, and Santin, "Equivalent Consumption Minimization Strategy for Parallel Hybrid Powertrains", Proceedings of the IEEE 55th Vehicular Technology Conference, 2002, pp. 2076-2081.
Sciarretta, Back, and Guzzella, "Optimal Control of Parallel Hybrid Electric Vehicles", IEEE Transactions on Control Systems Technology, vol. 12, No. 3, pp. 352-363, May 2004.
Sciarretta and Guzzella, "Control of Hybrid Electric Vehicles", IEEE Control Systems Magazine, vol. 27, No. 2, pp. 60-70, Apr. 2007.

* cited by examiner

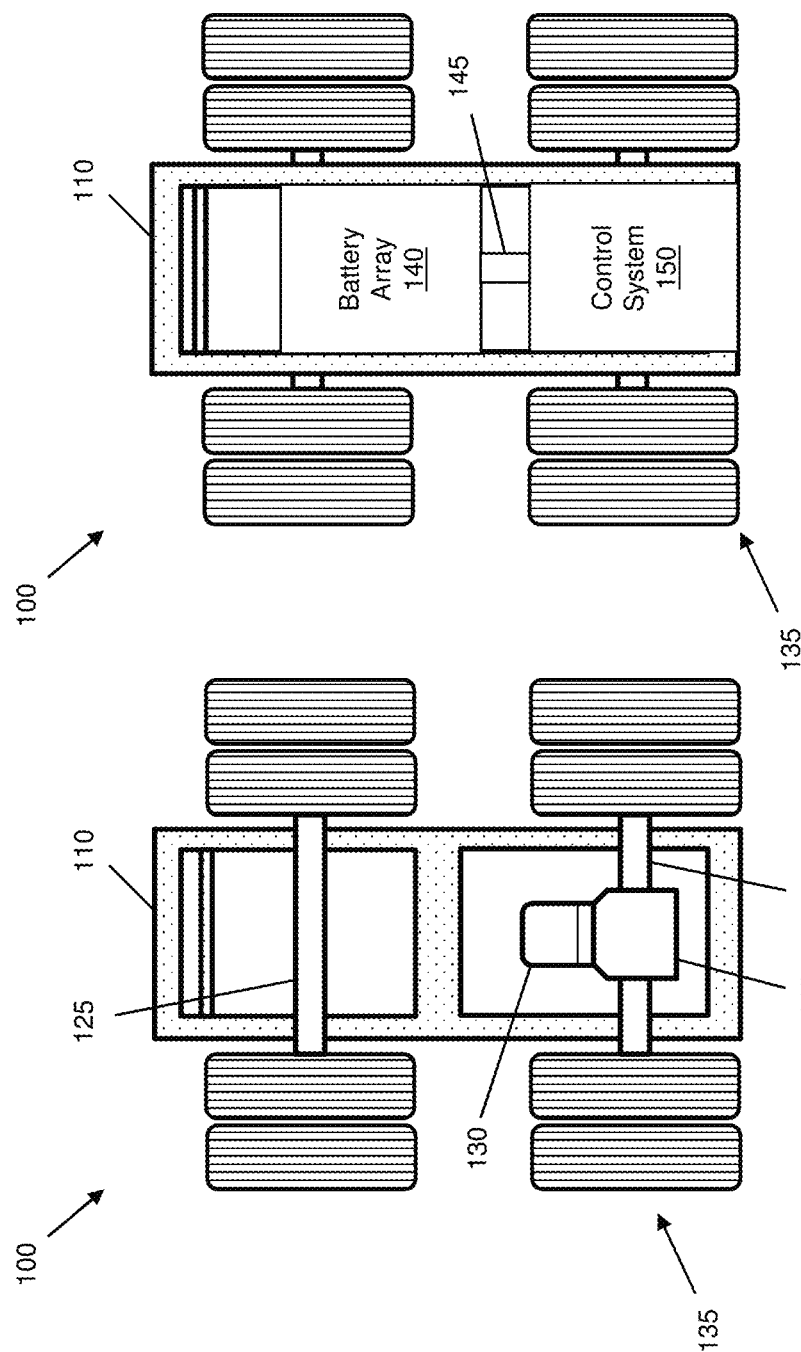

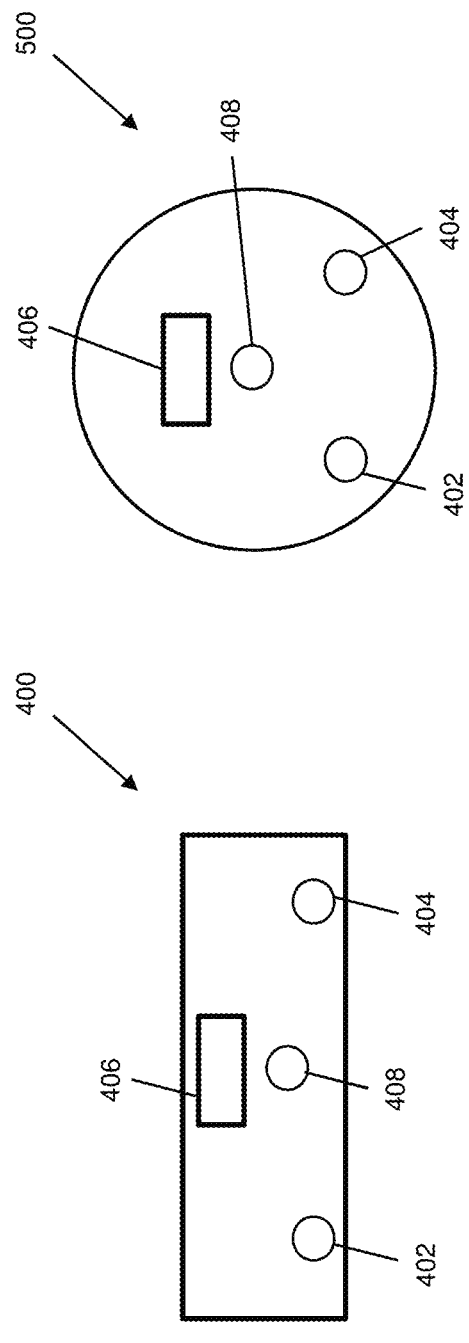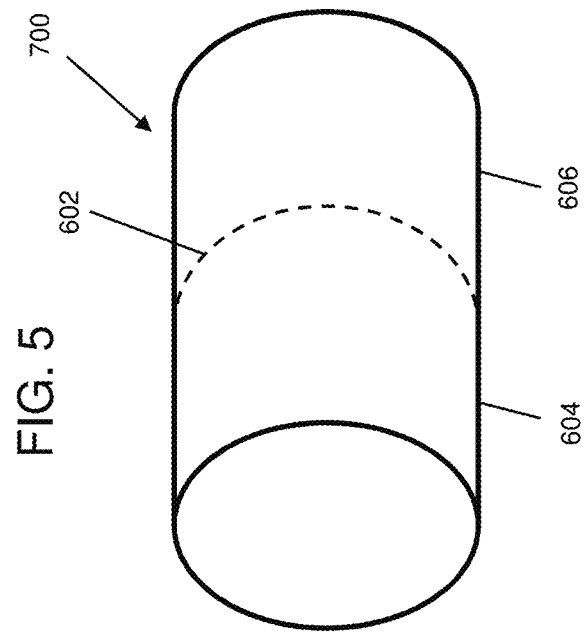

ELECTRIC VEHICLE ENERGY STORE WITH FUEL TANK FORM FACTOR AND MOUNTING CONFIGURATION

RELATED APPLICATIONS

The present application claims priority of U.S. Provisional Application No. 62/612,575, filed Dec. 31, 2017 and is related to U.S. application Ser. No. 15/721,345, filed Sep. 29, 2017, entitled "VEHICLE ENERGY MANAGEMENT SYSTEM AND RELATED METHODS" and naming Thomas Joseph Healy, Wilson Sa and Morgan Culbertson as inventors. Each of the foregoing applications is incorporated herein by reference.

BACKGROUND

Field of the Invention

The invention relates generally to hybrid vehicle technology and energy stores thereof, and in particular to systems and methods to intelligently control regeneration and reuse of captured energy in a through-the-road (TTR) hybrid configuration as well as systems and methods for storing electrical energy.

Description of the Related Art

The U.S. trucking industry consumes about 51 billion gallons of fuel per year, accounting for over 30% of overall industry operating costs. In addition, the trucking industry spends over $100 billion on fuel annually, and the average fuel economy of a tractor-trailer (e.g., an 18-wheeler) is only about 6.5 miles per gallon. For trucking fleets faced with large fuel costs, techniques for reducing those costs would be worth considering.

Hybrid technology has been in development for use in the trucking industry for some time, and some hybrid trucks have entered the market. However, existing systems are generally focused on hybridizing the drivetrain of a heavy truck or tractor unit, while any attached trailer or dead axles remain a passive load. Thus, the extent to which the fuel efficiency of a trucking fleet may be improved using these technologies may be limited to the fuel efficiencies obtained from improvement of the hybrid drivetrain and the in-fleet adoption of such hybrid drivetrain technologies. Given the large numbers of heavy trucks and tractor units already in service and their useful service lifetimes (often 10-20 years), the improved hybrid drivetrains that are candidates for introduction in new vehicles would only address a small fraction of existing fleets.

Separately, a battery pack is one of the key components of any hybrid vehicle technology. Batteries present a variety of challenges such as battery pack size and cost, among others. In particular, there is currently not a standardized footprint or form factor for battery packs, for example, within the trucking industry. As such, it is challenging, if not currently impossible, to provide a battery pack that is compatible with all vehicle manufacturers, makes, models, and configurations.

Thus, increased adoption, improved techniques, new functional capabilities, and new battery pack designs are all desired.

SUMMARY

It has been discovered that a through-the-road (TTR) hybridization strategy can facilitate introduction of hybrid electric vehicle technology in a significant portion of current and expected trucking fleets. In some cases, the technologies can be retrofitted onto an existing vehicle (e.g., a truck, a tractor unit, a trailer, a tractor-trailer configuration, at a tandem, etc.). In some cases, the technologies can be built into new vehicles. In some cases, one vehicle may be built or retrofitted to operate in tandem with another and provide the hybridization benefits contemplated herein. By supplementing motive forces delivered through a primary drivetrain and fuel-fed engine with supplemental torque delivered at one or more electrically-powered drive axles, improvements in overall fuel efficiency and performance may be delivered, typically without significant redesign of existing components and systems that have been proven in the trucking industry.

In addition, embodiments disclosed herein provide an energy store having a fuel tank form factor. In some examples, the energy store may be referred to as a battery or battery pack, an electrical accumulator, an accumulator fuel tank, or an energy store fuel tank. In various embodiments, the energy store fuel tank may have a similar size and shape to at least some existing, standardized diesel fuel tanks used in the trucking industry. The disclosed energy store fuel tank may be mounted, in some cases, using existing fuel tank mounting configurations. In various embodiments, the energy store fuel tank provides for receiving, storing, and providing electrical energy to a vehicle, where such electrical energy may be used for various purposes such as providing energy to an electrically powered axle, to provide an auxiliary power unit (APU), or for any of a variety of other uses.

In some embodiments of the present invention, an energy store tank assembly for use in a tractor-trailer vehicle includes a first tank adapted for mounting to a frame of the tractor-trailer vehicle by a first mounting bracket. The first mounting bracket is coupled to the frame, and the first mounting bracket extends around, and in contact with, a circumference of the first tank to secure the first tank to the frame. The energy store tank assembly further includes an energy store disposed within the first tank, the energy store configured to supply electrical power to the tractor-trailer vehicle in a first mode of operation and further configured to receive energy from the tractor-trailer vehicle in a second mode of operation. In some embodiments, the first tank includes an electrical interface through which the energy store supplies the electrical power to the tractor-trailer vehicle in the first mode of operation and through which the energy store receives energy from the tractor-trailer vehicle in the second mode of operation.

In some embodiments, the energy store tank assembly defines a substantially cylindrical housing, a substantially rectangular housing, or a substantially D-shaped housing.

In some embodiments, the electrical interface includes at least one high voltage connection and at least one low voltage connection.

In some embodiments, the energy store tank assembly further includes a plurality of coolant ports configured to provide for a flow of a coolant through the energy store tank assembly.

In some embodiments, the coolant includes a liquid coolant or an air coolant.

In some embodiments, the energy store tank assembly further includes a second tank adapted for mounting to the frame of the tractor-trailer vehicle by a second mounting bracket. The second mounting bracket is coupled to the frame, and the second mounting bracket extends around, and in contact with, a circumference of the second tank to secure the second tank to the frame. In some examples, the second tank is mounted adjacent to, and on a same side of the tractor-trailer vehicle as, the first tank.

In some embodiments, the second tank includes a diesel or alternative fuel tank.

In some embodiments, the first tank includes a common wall configured to physically separate the first tank into a first portion and a second portion. In some cases, the first portion includes the energy store, and the second portion includes a diesel or alternative fuel portion.

In some embodiments, the first tank is mounted to a first lateral side of the tractor-trailer vehicle. Additionally, the energy store tank assembly further includes a second tank adapted for mounting to the frame of the tractor-trailer vehicle by a second mounting bracket. The second mounting bracket is coupled to the frame, and the second mounting bracket extends around, and in contact with, a circumference of the second tank to secure the second tank to the frame. In some embodiments, the second tank is mounted to a second lateral side of the tractor-trailer vehicle opposite the first lateral side.

In some embodiments, the first tank includes a first common wall configured to physically separate the first tank into a first portion and a second portion. In some cases, the second tank includes a second common wall configured to physically separate the second tank into a third portion and a fourth portion. In various embodiments, the first portion includes the energy store, the second portion includes a first diesel or alternative fuel portion, the third portion includes another energy store, and the fourth portion includes a second diesel or alternative fuel portion.

In some embodiments, a trailer portion of the tractor-trailer vehicle includes an electrically powered drive axle configured to supply supplemental torque to one or more wheels of the trailer portion and to thereby supplement, while the trailer portion travels over a roadway and in at least some modes of operation, primary motive forces applied through a separate drivetrain powered by a fuel-fed engine of a tractor portion of the tractor-trailer vehicle. In some cases, the energy store is configured to supply the electrically powered drive axle with electrical power in the first mode of operation and is further configured to receive energy recovered using the electrically powered drive axle in the second mode of operation.

In some embodiments, the energy store is configured to supply electrical power to an auxiliary power unit (APU) on the tractor-trailer vehicle.

In some embodiments of the present invention, a system includes a vehicle including a communication interface coupled to a network, the communication interface configured to communicate with a remote transceiver. The system further includes an energy store on the vehicle, the energy store configured to supply electrical power to the communication interface. In some embodiments, the energy store includes a tank housing mounted to a frame of the vehicle by a mounting bracket coupled to the frame, where the mounting bracket extends around, and in contact with, a circumference of the tank housing to secure the tank to the frame. In some examples, the energy store further includes a battery pack disposed within the tank housing, and an electrical interface through which the battery pack supplies the electrical power to the communication interface.

In some embodiments, the battery pack is configured to supply electrical power to the vehicle in a first mode of operation and further configured to receive energy from the vehicle in a second mode of operation.

In some embodiments, the electrical interface includes at least one high voltage connection and at least one low voltage connection, and the tank housing includes a plurality of coolant ports configured to provide for a flow of a coolant through the tank housing to cool the battery pack.

In some embodiments, the tank housing includes a common wall configured to physically separate the tank housing into a first portion and a second portion, where the first portion includes the battery pack, and where the second portion includes a diesel or alternative fuel portion.

In some embodiments, the vehicle includes a tractor-trailer vehicle.

In some embodiments, a trailer portion of the tractor-trailer vehicle includes an electrically powered drive axle configured to supply supplemental torque to one or more wheels of the trailer portion and to thereby supplement, while the trailer portion travels over a roadway and in at least some modes of operation, primary motive forces applied through a separate drivetrain powered by a fuel-fed engine of a tractor portion of the tractor-trailer vehicle. In addition, in some embodiments, the energy store is configured to supply the electrically powered drive axle with electrical power in the first mode of operation and is further configured to receive energy recovered using the electrically powered drive axle in the second mode of operation.

In some embodiments, the energy store is configured to supply electrical power to an auxiliary power unit (APU) on the vehicle.

In some embodiments, the system further includes a diesel or alternative fuel tank mounted adjacent to, and on a same side of the vehicle as, the tank housing of the energy store.

BRIEF DESCRIPTION OF THE DRAWINGS

The present invention is illustrated by way of example and not limitation with reference to the accompanying figures, in which like references generally indicate similar elements or features.

FIG. 1A depicts a bottom view of a hybrid suspension system, in accordance with some embodiments;

FIG. 1B depicts a top view of the hybrid suspension system, in accordance with some embodiments;

FIGS. 4 and 5 illustrate exemplary side views of energy store fuel tanks including electrical and hydraulic connections, in accordance with some embodiments;

FIGS. 6 and 7 illustrate exemplary energy store fuel tanks that include a common wall to separate the energy store fuel tanks into a first portion and a second portion, in accordance with some embodiments;

Figure 1C:
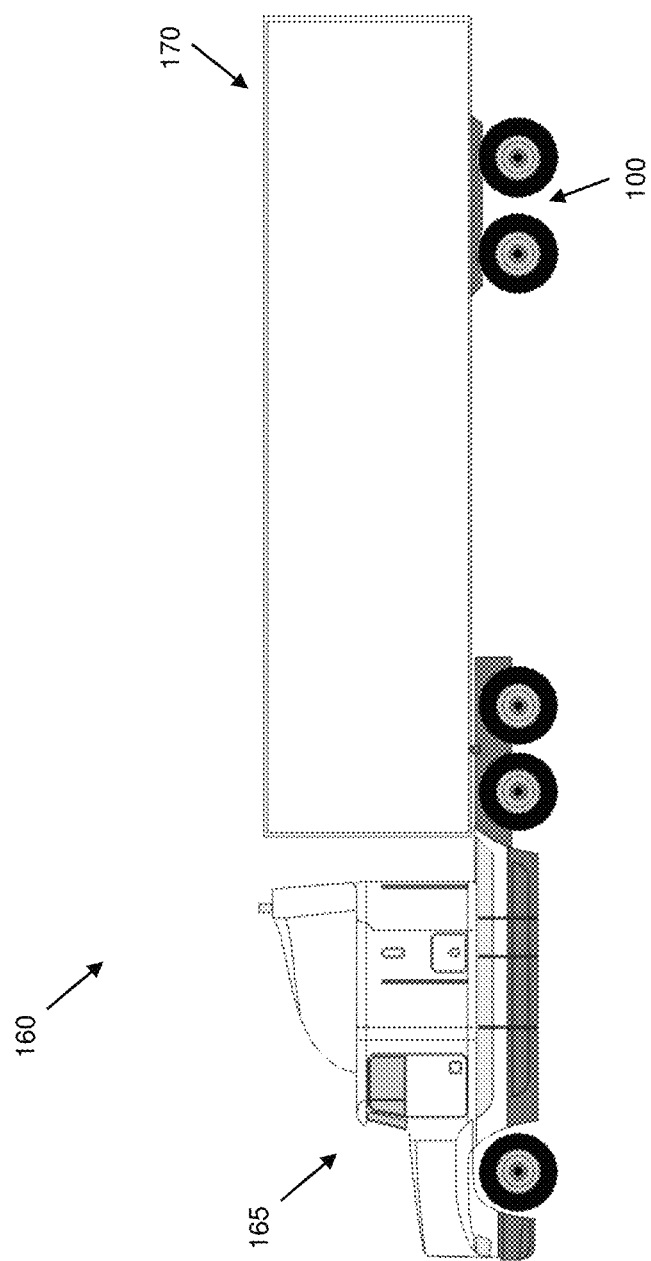
FIG. 1C depicts an exemplary tractor-trailer vehicle, including the hybrid suspension system, in accordance with some embodiments.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of certain embodiments of the present invention(s).

DESCRIPTION

The present application describes a variety of embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In particular, the present disclosure describes designs and techniques for providing an energy management system and related methods in the context of systems and components typical in the heavy trucking industry. Some embodiments of the present invention(s) provide a hybridized suspension assembly (e.g., an electrically driven axle, power source, controller, etc. that may be integrated with suspension components) affixed (or suitable for affixing) underneath a vehicle (e.g., a truck, tractor unit, trailer, tractor-trailer or tandem configuration, etc.) as a replacement to a passive suspension assembly. In various non-limiting example configurations, a hybridized suspension assembly can be part of a trailer that may be towed by a powered vehicle, such as a fuel-consuming tractor unit.

As described in more detail below, a hybridized suspension assembly is but one realization in which an electrically driven axle operates largely independently of the fuel-fed engine and primary drivetrain of a powered vehicle and is configured to operate in a power assist, regeneration, and passive modes to supplement motive/braking forces and torques applied by the primary drivetrain and/or in braking.

In general, one or more electrically driven axles may supplement motive/braking forces and torques under control of a controller (or controllers) that does not itself (or do not themselves) control the fuel-fed engine and primary drivetrain. Instead, a control strategy implemented by an electric drive controller seeks to follow and supplement the motive inputs of the fuel-fed engine and primary drivetrain using operating parameters that are observable (e.g., via CANbus or SAE J1939 type interfaces), kinematics that are sensed and/or states that may be computationally estimated based on either or both of the foregoing. In some embodiments, based on such observed, sensed or estimated parameters or states, the electric drive controller applies an equivalent consumption minimization strategy (ECMS) or adaptive ECMS type control strategy to modulate the motive force or torque provided, at the electrically driven axle(s), as a supplement to that independently applied using the fuel-fed engine and primary drivetrain of the powered vehicle.

By supplementing the fuel-fed engine and primary drivetrain of the powered vehicle, some embodiments of the present invention(s) seek to simultaneously optimize fuel consumption of the powered vehicle, energy consumption of the hybrid suspension assembly, and/or state of charge (SOC) of on-board batteries or other energy stores. In some cases, such as during stopovers, embodiments of the present disclosure allow the fuel-fed engine to shut down rather than idle. In some cases, energy consumption management strategies may take into account a desired SOC at scheduled, mandated or predicted stopovers. Among other advantages, embodiments disclosed herein provide for a significant reduction in fuel consumption (e.g., an average of about 30%), a built-in auxiliary power unit (APU), enhanced stability control, improved trailer dynamics, and a host of other benefits, at least some of which are described in more detail below.

Referring now to FIGS. 1A-1C, where FIGS. 1A and 1B illustrate a hybrid suspension system 100, and FIG. 1C illustrates a tractor-trailer vehicle including the hybrid suspension system 100. As used herein, the term hybrid suspension system is meant to convey to a person of skill in the art having benefit of the present disclosure, a range of embodiments in which some or all components of a supplemental electrically driven axle, often (though not necessarily) including a controller, a power source, brake line sensors, CANbus or SAE J1939 type interfaces, sensor packages, off-vehicle radio frequency (RF) communications and/or geopositioning interfaces, etc. are packaged or integratable with components that mechanically interface one or more axles and wheels to the frame or structure of a vehicle and which typically operate (or interface with additional components) to absorb or dampen mechanical perturbations and maintain tire contact with a roadway during travel thereover. In some though not all embodiments, a hybrid suspension system can take on the form or character of an assembly commonly referred to in the U.S. trucking industry as a slider box. In some though not all embodiments, a hybrid suspension system may be or become more integral with a vehicle frame and need not have the modular or fore/aft adjustability commonly associated with slider boxes.

Likewise, the "hybrid" or hybridizing character of a hybrid suspension system, such as hybrid suspension system 100, will be understood by persons of skill in the art having benefit of the present disclosure in the context of its role in hybridizing the sources of motive force or torque available in an over-the-road vehicle configuration that includes it. Accordingly, a hybrid suspension system including an electrically-driven axle and controller for coordinating its supplementation of motive force or torques need not, and typically does not itself include, the additional drive axles driven by the fuel fed engine to which it contributes a hybrid or hybridizing source of motive force or torque. Thus, the tractor-trailer configuration (160) illustrated in FIG. 1C is exemplary and will be understood to include a hybrid suspension system, notwithstanding the ability of the trailer (170) to be decoupled from tractor units (e.g., tractor unit 165) that provide the fuel fed engine and primary drivetrain to which it acts as a supplement. Correspondingly, a vehicle such as a heavy truck having a single frame or operable as or with tandem trailers (not specifically shown in FIG. 1C) will be understood to be amenable to inclusion of one or more hybrid suspension systems.

In view of the foregoing, and without limitation, hybrid suspension system-type embodiments are now described with respect to specific examples.

Hybrid Suspension System

As described in more detail below, the hybrid suspension system 100 may include a frame 110, a suspension, one or more drive axles (e.g., such as a drive axle 120), at least one electric motor-generator (e.g., such as an electric-motor generator 130) coupled to the at least one or more drive axles, an energy storage system (e.g., such as a battery array 140), and a controller (e.g., such as a control system 150). In accordance with at least some embodiments, the hybrid suspension system 100 is configured for attachment beneath a trailer. As used herein, the term "trailer" is used to refer to an unpowered vehicle towed by a powered vehicle. In some cases, the trailer may include a semi-trailer coupled to and towed by a truck or tractor (e.g., a powered towing vehicle). By way of example, FIG. 1C illustrates a tractor-trailer vehicle 160 that includes a tractor 165 coupled to and operable to tow a trailer 170. In particular, and in accordance with embodiments of the present disclosure, the hybrid suspension system 100 is coupled underneath the trailer 170, as a replacement to a passive suspension assembly, as discussed in more detail below. For purposes of this discussion, the tractor 165 may be referred to generally as a "powered towing vehicle" or simply as a "powered vehicle".

To be sure, embodiments of the present disclosure may equally be applied to other types of trailers (e.g., utility trailer, boat trailer, travel trailer, livestock trailer, bicycle trailer, motorcycle trailer, a gooseneck trailer, flat trailer, tank trailer, farm trailer, or other type of unpowered trailer) towed by other types of powered towing vehicles (e.g., pickup trucks, automobiles, motorcycles, bicycles, buses, or other type of powered vehicle), without departing from the scope of this disclosure. Likewise, although components are introduced and described in the context of an exemplary suspension assembly for a trailer, persons of skill in the art having benefit of the present disclosure will appreciate adaptations of configurations and components introduced in the exemplary trailer context to supplemental electrically driven axle applications such as affixed (or suitable for affixing) underneath a vehicle (e.g., a truck, tractor unit, trailer, tractor-trailer or tandem configuration, etc.).

Vehicles may utilize a variety of technologies and fuel types such as diesel, gasoline, propane, biodiesel, ethanol (E85), compressed natural gas (CNG), hydrogen internal combustion engine (ICE), homogeneous charge compression ignition (HCCI) engine, hydrogen fuel cell, hybrid electric, plug-in hybrid, battery electric, and/or other type of fuel/technology. Regardless of the type of technology and/or fuel type, the powered towing vehicle (or more generally the fuel-fed engine of a powered vehicle) may have a particular fuel efficiency. As described below, and among other advantages, embodiments of the present disclosure provide for improved fuel efficiency of the powered vehicle, as described in more detail herein. More generally, and in accordance with various embodiments, the hybrid suspension system 100 described herein is configured (or may be adapted) for use with any type of trailer or powered vehicle.

In some embodiments, the hybrid suspension system 100 includes one or more on-board sensors. As used herein, the term "on-board sensors" may be used to describe sensors that are coupled to or part of the hybrid suspension system 100, sensors that are coupled to or part of a trailer to which the hybrid suspension system 100 is attached, as well as remote sensors that may communicate (e.g., by way of cellular, wireless, RF, satellite, or other such communication) data to a receiver or transceiver that is coupled to or part of the hybrid suspension system 100 or the trailer. In some embodiments, the described sensors may be coupled to or part of a tractor (e.g., the tractor 165) to which the trailer is coupled. In various embodiments, the sensors may include one or more of a brake pressure sensor, an altitude and heading reference system, one or more smart sensors which may include a global positioning system as well as other smart sensors and/or telematics systems, a trailer weight sensor which may include an air bag pressure sensor (e.g., provided in a suspension assembly of the towed vehicle) or other type of weight sensor, a speed sensor, a gyroscope, an accelerometer, a magnetometer, a lateral acceleration sensor, a torque sensor, an inclinometer, and/or other suitable sensor.

In addition, the hybrid suspension system 100 is configured to operate largely independently of the fuel-fed engine and primary drivetrain of a powered vehicle and, in some cases, autonomously from the engine and drivetrain controls of the powered vehicle. As used herein, "autonomous" operation of the hybrid suspension system 100 is terminology used to describe an ability of the hybrid suspension system 100 to operate without commands or signals from the powered towing vehicle, to independently gain information about itself and the environment, and to make decisions and/or perform various functions based on one or more algorithms stored in the controller. "Autonomous" operation does not preclude observation or estimation of certain parameters or states of a powered vehicle's fuel-fed engine or primary drivetrain; however, in some embodiments of the present invention(s), electrically driven axles are not directly controlled by an engine control module (ECM) of the powered vehicle and, even where ECMS or adaptive ECMS-type control strategies are employed, no single controller manages control inputs to both the supplemental electrically driven axle(s) and the primary fuel-fed engine and drivetrain.

A trailer, as typically an unpowered vehicle, includes one or more passive axles. By way of example, embodiments of the present disclosure provide for replacement of the one or more passive trailer axles with one or more powered axles. For example, in at least some embodiments, the hybrid suspension system 100 may replace a passive tandem axle with a powered tandem axle, as shown in the example of FIG. 1C. In accordance with some embodiments the present invention(s), the hybrid suspension system 100 can be configured to provide, in a first mode of operation, a motive rotational force (e.g., by an electric motor-generator coupled to a drive axle) to propel the hybrid suspension system 100, and thus the trailer under which is attached, thereby providing an assistive motive force to the powered towing vehicle. Thus, in some examples, the first mode of operation may be referred to as a "power assist mode." Additionally, in some embodiments, the hybrid suspension system 100 is configured to provide, in a second mode of operation, a regenerative braking force (e.g., by the electric motor-generator coupled to the drive axle) that charges an energy storage system (e.g., the battery array). Thus, in some examples, the second mode of operation may be referred to as a "regeneration mode." In some examples, the hybrid suspension system 100 is further configured to provide, in a third mode of operation, neither motive rotational nor regenerative braking force such that the trailer and the attached hybrid suspension system 100 are solely propelled by the powered towing vehicle to which the trailer is coupled. Thus, in some examples, the third mode of operation may be referred to as a "passive mode."

In providing powered axle(s) to the trailer (e.g., by the hybrid suspension system 100), embodiments of the present disclosure result in a significant reduction in both fuel consumption and any associated vehicle emissions, and thus a concurrent improvement in fuel efficiency, of the powered towing vehicle. In addition, various embodiments may provide for improved vehicle acceleration, vehicle stability, and energy recapture (e.g., via regenerative braking) that may be used for a variety of different purposes. For example, embodiments disclosed herein may use the recaptured energy to apply the motive rotational force using the electric motor-generator and/or to provide an auxiliary power unit (APU) that may be used for powering a lift gate, a refrigeration unit, a heating ventilation and air conditioning (HVAC) system, pumps, lighting, communications systems, or other accessory devices (e.g., during a stopover). It is noted that the above advantages and applications are merely exemplary, and additional advantages and applications will become apparent to those skilled in the art upon review of this disclosure.

Referring again to FIG. 1A, illustrated therein is a bottom view of an exemplary hybrid suspension system 100 which shows the frame 110, the drive axle 120, a passive axle 125, and wheels/tires 135 coupled to ends of each of the drive axle 120 and the passive axle 125. In some embodiments, the electric motor-generator 130 is coupled to the drive axle 120 by way of a differential 115, thereby allowing the electric motor generator 130 to provide the motive rotational force in the first mode of operation, and to charge the energy storage system (e.g., the battery array) by regenerative braking in the second mode of operation. Note that in some embodiments, components such as the electric motor generator, gearing and any differential may be more or less integrally defined, e.g., within a single assembly or as a collection of mechanically coupled components, to provide an electrically-driven axle. While shown as having one drive axle and one passive axle, in some embodiments, the hybrid suspension system 100 may have any number of axles, two or more drive axles, as well as multiple electric-motor generators on each drive axle. In addition, axles of the hybrid suspension system (e.g., the drive axle 120 and the passive axle 125) may be coupled to the frame 110 by a leaf spring suspension, an air suspension, a fixed suspension, a sliding suspension, or other appropriate suspension. In some embodiments, the wheels/tires 135 coupled to ends of one or both of the drive axle 120 and the passive axle 125 may be further coupled to a steering system (e.g., such as a manual or power steering system), thereby providing for steering of the hybrid suspension system 100 in a desired direction.

With reference to FIG. 1B, illustrated therein is a top view of the hybrid suspension system 100 showing the battery array 140 and the control system 150. In various embodiments, the battery array 140 and the control system 150 may be coupled to each other by an electrical coupling 145. In addition, the electric motor-generator 130 may be coupled to the control system 150 and to the battery array 140, thereby providing for energy transfer between the battery array 140 and the electric motor-generator 130. In various examples, the battery array 140 may include one or more of an energy dense battery and a power dense battery. For example, in some embodiments, the battery array 140 may include one or more of a nickel metal hydride (NiMH) battery, a lithium ion (Li-ion) battery, a lithium titanium oxide (LTO) battery, a nickel manganese cobalt (NMC) battery, a supercapacitor, a lead-acid battery, or other type of energy dense and/or power dense battery.

For purposes of this discussion, the hybrid suspension system 100, the coupled trailer, and the powered vehicle may be collectively referred to as "a hybrid trailer vehicle system (HTVS)". Thus, in some embodiments, the tractor-trailer vehicle 160 of FIG. 1C may be referred to as an HVTS.

Exemplary Network Design

Figure 1D:
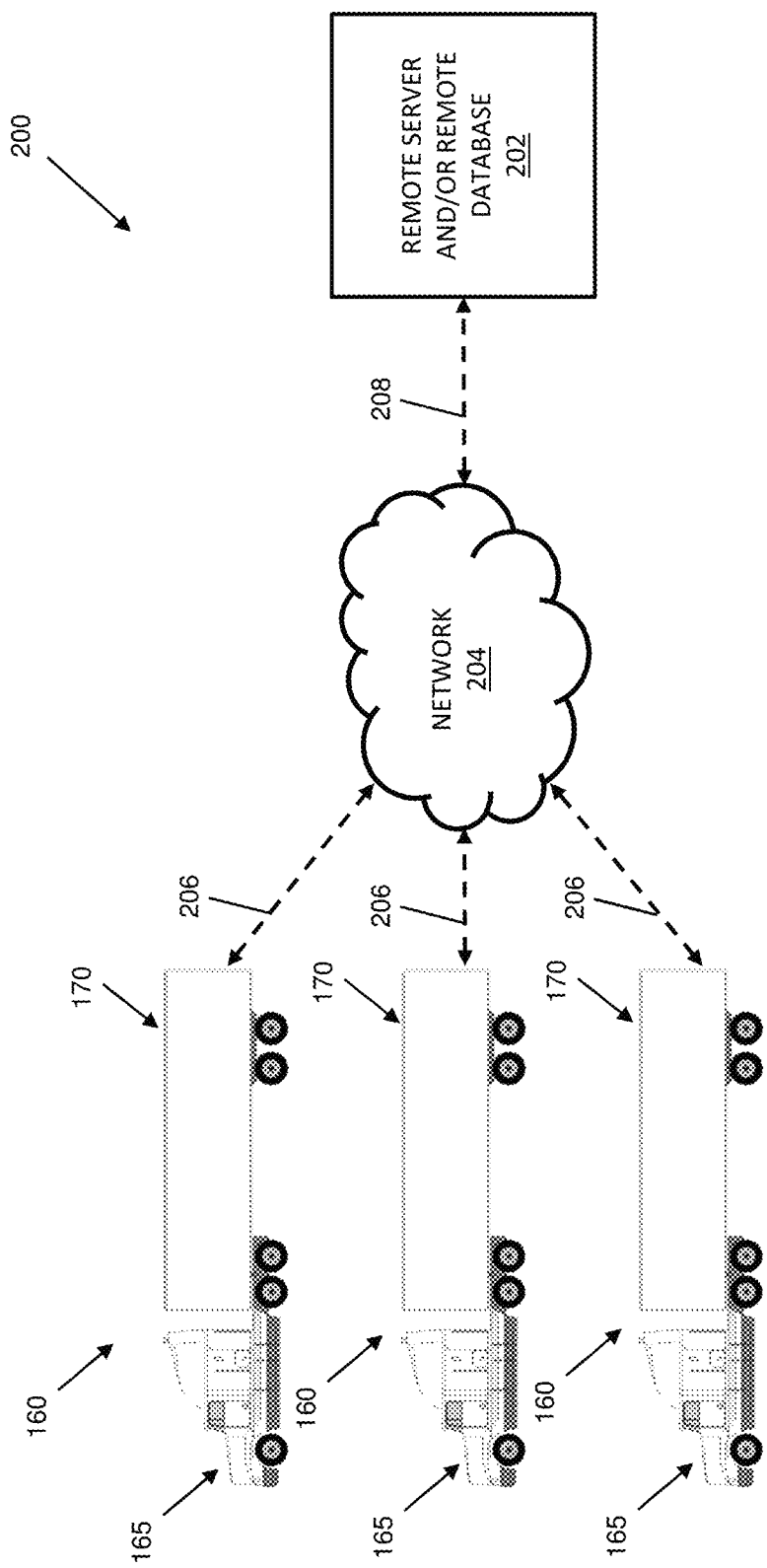
FIG. 1D depicts an exemplary system for providing communication between a tractor-trailer vehicle and a network-connected service platform, in accordance with some embodiments.
Figure 1E:
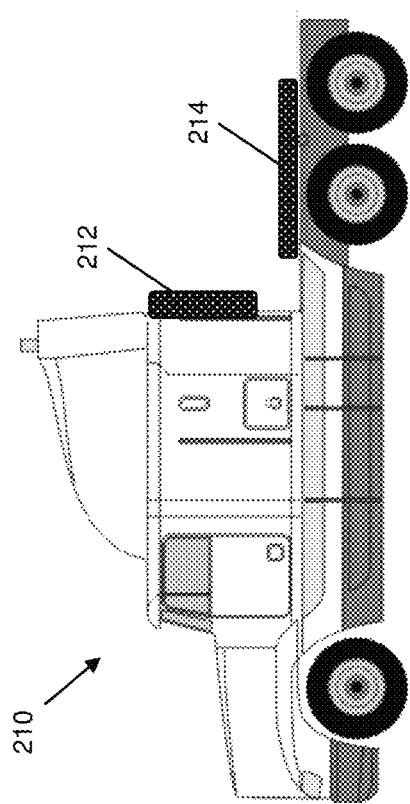
FIG. 1E depicts an exemplary tractor unit including an autonomous hybrid electric drive (AHED) unit, in accordance with some embodiments.
Figure 1F:
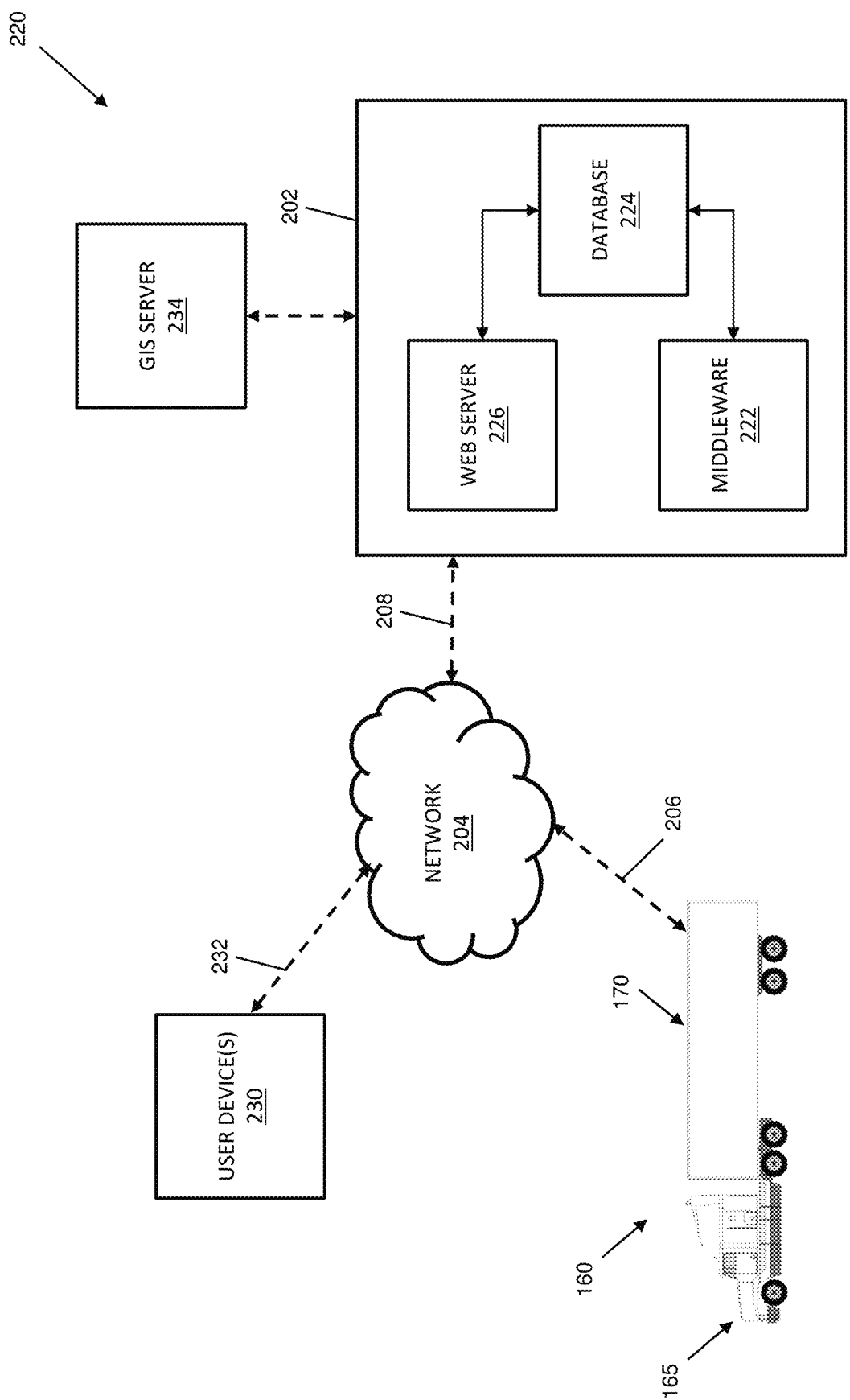
FIG. 1F depicts another exemplary system for providing communication between a tractor-trailer vehicle and a network-connected service platform, in accordance with some embodiments.

With reference to FIGS. 1D-1F, the previously described hybrid suspension system 100, and more generally any of a plurality of tractor-trailer vehicles 160, may be configured to communicate with a network-connected server, database, or other network-connected service platform to provide the various functionality disclosed herein, or other features and/or functionality. For example, and with reference to FIG. 10, an exemplary system 200 for providing communication between a tractor-trailer vehicle and a network-connected service platform is shown. In some embodiments, one or more tractor-trailer vehicles 160 are configured to communicate with a remote server 202 by way of a network 204, using one or more network communication devices.

The network 204 may be implemented as a single network or a combination of multiple networks. For example, in various embodiments, the network 204 may include the Internet and/or one or more intranets, landline networks, wireless networks, cellular networks, satellite networks, point-to-point communication links, and/or other appropriate types of networks. In some examples, the one or more tractor-trailer vehicles 160 and the remote server 202 may communicate through the network 204 via cellular communication, by way of one or more user-side network communication devices or server-side network communication devices. Thus, as merely one example, connections 206 between the one or more tractor-trailer vehicles 160 and the network 204 may include a 3G cellular connection, a universal mobile telecommunications system (UMTS) connection, a high-speed packet access (HSPA) connection, a 4G/LTE connection, a combination thereof, or other appropriate connection now existing or hereafter developed. Further, in an example, a connection 208 between the network 204 and the remote server 202 may include an Internet trunk connection. The Internet truck connection may be used to simultaneously provide network access to a plurality of clients, for example, such as the one or more tractor-trailer vehicles 160.

In other examples, the one or more tractor-trailer vehicles 160 and the remote server 202 may communicate through the network 204 via wireless communication (e.g., via a WiFi network), by way of one or more user-side network communication devices or server-side network communication devices. In yet other examples, the one or more tractor-trailer vehicles 160 and the remote server 202 may communicate through the network 204 via any of a plurality of other radio and/or telecommunications protocols, by way of one or more user-side network communication devices or server-side network communication devices. While some examples of communication between the one or more tractor-trailer vehicles 160 and the remote server 202 have been provided, those skilled in the art in possession of the present disclosure will recognize other network configurations, components, and/or protocols that may be used, while remaining within the scope of the present disclosure.

Referring now to FIG. 1E, an exemplary tractor unit 210 suitable for implementation within the system 200 is provided. In some embodiments, the tractor unit 210 may be substantially similar to the tractor unit 165 described above. As shown, the tractor unit 210 may include an autonomous hybrid electric drive (AHED) unit including a management and control mobile controller (MCOMCTLR) 212 and a hybrid auxiliary device controller (HADCTLR) 214. In some cases, one or more features of, or functions provided by, the AHED unit may be included within or provided by the control system 150, described above. Stated another way, and in some embodiments, the control system 150 may be used to implement the various functions of the AHED unit described herein. In some embodiments, the AHED unit may provide various operating modes such as a hybrid (autonomous) operating mode, an APU Prep mode, an APU mode (e.g., where the AHED unit operates as an APU), a manual control mode (including sub-modes such as neutral, drive, regen, sleep, update), and an anti-theft mode (e.g., that may disable one or more functions of the tractor-trailer vehicle 160). Generally, in various cases, the AHED unit may be configured for communication with the remote server 202 by way of the network 204. In some examples, the AHED unit may be used to transmit component/asset and telematics data to the remote server 202. While shown as attached to portions of the tractor unit 210, in some cases, the AHED unit or components thereof (e.g., one or both of the MCOMCTLR 212 and the HADCTLR 214) may alternatively be attached to portions of a trailer (e.g., the trailer 170) towed by the tractor unit.

The MCOMCTLR 212 more specifically may function as a management, algorithmic, and communications module for the AHED unit. For example, the MCOMCTLR 212 may be used to connect to the remote server 202 via the network 204, and to the HADCTLR 214 via a CAN V2.0 connection. In various embodiments, the MCOMCTLR 212 has cellular, GPS, data protocol, algorithmic, statistical and system management responsibilities. For instance, the MCOMCTLR 212 manages messaging, events, and reporting to the remote server 202, performs an Autonomous/Hybrid Control algorithm, provides error detection and recovery, monitors the HADCTLR 214, gathers and reports GPS information (e.g., to the remote server 202), manages over the air updates, and provides a single management interface to the remove server 202.

The HADCTLR 214, in some cases, includes an embedded controller disposed within a grounded, low-voltage (GLV) enclosure. The HADCTLR 214 may be used to control system relays, component initialization sequences, and SAE J1939 message capture and forwarding. A select set of SAE J1939 messages may be forwarded to the MCOMCTLR 212 for algorithmic and statistical processing via the internal CAN bus. By way of example, the HADCTLR 214 manages device activation via relays driven by CAN messages (e.g., devices such as an AC Motor controller, a battery management system, a DC/DC Inverter, an altitude and heading reference system (AHRS), temperature sensors, or other such devices), maintains and sends state information to the MCOMCTLR 212, and captures J1939 bus CAN messages (e.g., from the tractor unit 210) and forwards the select set of J1939 messages to the MCOMCTLR 212, as noted.

With reference to FIG. 1F, illustrated therein is an exemplary system 220 for providing communication between a tractor-trailer vehicle and a network server or remote server/database. Various aspects of the system 220 are substantially the same as the system 200, discussed above. Thus, for clarity of discussion, some features may only be briefly discussed. FIG. 1F, in particular, provides a more detailed view of the remote server 202. As shown, the remove server 202 may include a middleware component 222, a database 224, and a web server 226. In various examples, each of the middleware 222, the database 224, and the web server 226 may be implemented using separate machines (e.g., computers/servers), or may be collocated on a single machine. The middleware 222 may be configured to receive and process data (e.g., from the AHED unit) and store the data in the database 224. The database 224 may be used to store any such data received from AHED units of any of a number of tractor-trailer vehicles 160, as well as to store customer/user account information, and store asset tracking information (e.g., for tracking the tractor-trailer vehicles 160). In some examples, the database 224 is implemented using a PostgreSQL object-relational database management system, enabling multi-node clustering. The web server 226 can be used to store, process, and deliver web pages (e.g., that provide a user-interface) to any of a plurality of users operating user devices 230. In some embodiments, the user devices 230 may include any type of computing device such as a laptop, a desktop, a mobile device, or other appropriate computing device operated by any type of user (e.g., individual, driver, fleet manager, or other type of user). In some examples, connections 232 between the user devices 230 and the network 204 may include a 3G cellular connection, a universal mobile telecommunications system (UMTS) connection, a high-speed packet access (HSPA) connection, a 4G/LTE connection, an RF connection, a Wi-Fi connection, a Bluetooth connection, another wireless communication interface, combinations thereof, or other appropriate connection now existing or hereafter developed. In some embodiments, the remote server 202 may further couple to a geographic information system (GIS) server 234, which provides maps for the GPS locations associated with data received from the AHED unit. In one example, a single instance of the middleware 222, the database 224, the web server 226, and the GIS server 234 may support up to 10,000 AHED units, and thus up to 10,000 tractor-trailer vehicles 160. Thus, instances of one or more of these components may be scaled up as needed in order to meet various performance and/or economic goals.

In addition to the various features described above, the systems 200, 220 may be configured to provide real-time location and mapping of tractor-trailer vehicles 160 (including a tractor unit or trailer), an ability to assign tags to any particular tractor unit or trailer (e.g., to provide a trailer type, trailer number, group/region/fleet information, owner information, or contact information), an ability to provide on-demand and/or schedulable reports, among other features. By way of example, such reports may include a percentage time a trailer is loaded vs. empty, moving vs. stationary, and/or attached vs. standalone. Exemplary reports may further provide an approximate trailer weight, fuel savings information, shock/vibration information, braking information, adverse swaying (e.g., jack-knifing) information, lost traction/wheel-slip information, battery levels, and/or APU usage information. The systems 200, 220 also provide for the configuration of alerts (e.g., to alert a driver, fleet manager, or other user) for a variety of conditions such as aggressive braking, excessive shock, excessive idling, APU power low, overheating, unit damage, and/or battery or device failure. In some embodiments, the systems 200, 220 may further include an ability to set and/or otherwise define 'Operation Hours' for a given trailer and/or tractor unit, and alerts may be set for operation activity occurring outside the defined 'Operation Hours'. In some cases, the systems 200, 220 may also monitor driver behaviors (e.g., driving patterns), real-time traffic data, weather information, road conditions, and/or other such factors that may be used to determine a desired stopover location, an optimal navigation route to the stopover location, and/or an estimated time of arrival (ETA) at the stopover location. For example, in some embodiments, one or more of the above features may be implemented in part using a vehicle navigation system (e.g., such as a GPS navigation system) on the tractor-trailer vehicles 160, where the navigation system incorporates the traffic data, weather information, road conditions, etc. to determine the route and ETA to the stopover location. While some examples of various features provided by the systems 200, 220 have been provided, those skilled in the art in possession of the present disclosure will recognize other features that may be implemented, while remaining within the scope of the present disclosure.

With reference to the hybrid suspension system 100 discussed above, and more generally with reference to the systems 200, 220, the systems may be used to monitor one or more pneumatic brake lines, such that embodiments of the present disclosure provide a 'fail safe' mode where the hybrid suspension system 100 will not accelerate (e.g., operate in a power assist mode) while a driver (e.g. of the powered vehicle) is actuating a brake system. In various embodiments, by monitoring feedback pressure of each wheel's brake lines, as well as their respective wheel speeds, the present system can determine how each brake for a particular wheel is performing. Thus, in various examples, embodiments of the present disclosure may provide for braking and/or powering of different wheels independently from one another for increased trailer/vehicle stability. In some cases, this may be referred to as "torque vectoring". By way of example, such torque vectoring embodiments may be particularly useful when there are differences in roadway surfaces upon which each of a plurality of wheels of the HTVS is traveling (e.g., when roadway conditions are inconsistent, slippery, rough, etc.).

In addition, and in various embodiments, the present system may be deployed with two pneumatic brake lines (e.g., which may include existing brake lines), while an entirety of the controls (e.g., including sensor input processing, mode of operation control, aspects of the various methods described above, and other decision-making controls) may reside entirely within the hybrid suspension system 100 itself (e.g., and in many respects, within the control system 150). To be sure, in some examples, the controls may equally or alternatively reside in other components of the systems 200, 220, such as within the AHED units, the user devices 230, the remote server 202, the GIS server 234, or a combination thereof.

Energy Store Fuel Tank

As previously noted, a battery pack is one of the key components of any hybrid vehicle technology, for example, such as described with reference to the hybrid suspension system 100 and the systems 200, 220 (e.g., that include tractor-trailer vehicles 160 employing hybrid technology). However, batteries present a variety of challenges such as battery pack size and cost, among others. In particular, there is currently not a standardized footprint or form factor for battery packs within the trucking industry. As such, it is challenging, if not currently impossible, to provide a battery pack that is compatible with all vehicle manufacturers, makes, models, and configurations. Thus, increased adoption, improved techniques, new functional capabilities, and new battery pack designs are all desired.

Embodiments disclosed herein provide an energy store having a fuel tank form factor. In some examples, the energy store may be referred to as a battery or battery pack, an electrical accumulator, an accumulator fuel tank, or an energy store fuel tank. In some embodiments, the energy store includes the battery array 140, discussed above. In accordance with various embodiments, the energy store fuel tank disclosed herein may have a similar size and shape to at least some existing, standardized diesel fuel tanks used in the trucking industry. Thus, in some cases, the disclosed energy store fuel tank may be mounted using existing fuel tank mounting configurations. In various embodiments, the energy store fuel tank provides for receiving, storing, and providing electrical energy to a vehicle, where such electrical energy may be used for various purposes such as providing energy to an electrically powered axle, to provide an auxiliary power unit (APU), or for any of a variety of other uses.

It is also noted that while the above discussion is primarily directed to charging the energy storage system (e.g., the battery array) by regenerative braking, other methods of energy recapture are possible and within the scope of this disclosure. For example, in some embodiments, a hydraulic system (e.g., used to capture energy via air pressure or fluid pressure), flywheels, solar panels, alternator power, or a combination thereof may be used for energy recapture. Additionally, in some cases, the HVTS 160 may include shocks (e.g., as part of a suspension of the powered vehicle and/or of the hybrid suspension system 100), which may include regenerative shock absorbers, that may be used to capture electrical energy via the motion and/or vibration of the shocks. In some embodiments, energy captured by one or more of the above methods may be used to charge the energy store fuel tank.

When supplying energy to provide an electric auxiliary power unit (APU), the APU may be used for powering a host of devices and/or systems, both on the trailer and on the powered towing vehicle. For example, in various embodiments, the APU may be used to power a lift gate, a refrigeration unit, a heating ventilation and air conditioning (HVAC) system, pumps, lighting, appliances, entertainment devices, communications systems, or other electrically powered devices during a stopover. Regardless of where the power is being provided, embodiments disclosed herein provide for energy storage (and in some cases energy management) to be within the energy store fuel tank disclosed herein.

Figure 2:
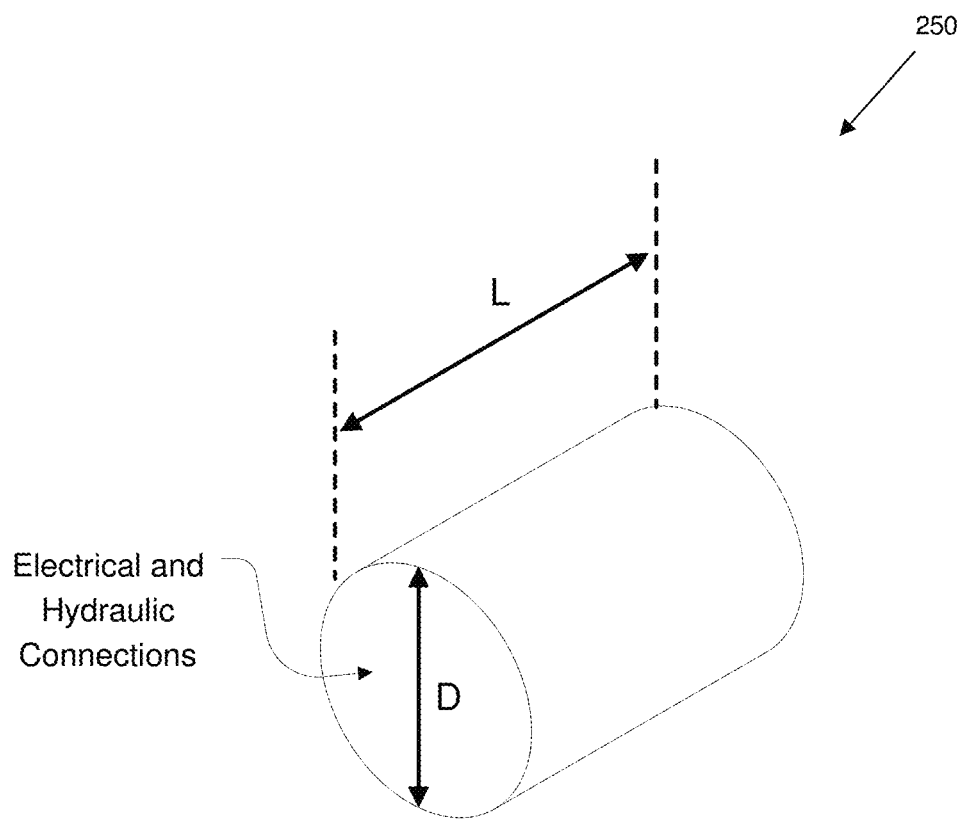
FIG. 2 provides a diagram of an exemplary energy store fuel tank, in accordance with some embodiments.

Referring now to FIG. 2, illustrated therein is an exemplary energy store fuel tank 250 (e.g., having one or more battery packs disposed therein) that defines a substantially cylindrical housing. In other examples, the energy store fuel tank 250 may define a substantially rectangular housing or a substantially D-shaped housing. For the case of a cylindrical housing, the energy store tank 250 has a diameter 'D'. In various cases, the diameter 'D' may be about 23 inches or 24.5 inches. For purposes of this disclosure, and in various embodiments, the energy store fuel tank 250 may have any arbitrary length 'L'. The energy store fuel tank 250 may also include electrical and hydraulic connections, discussed in more detail below.

In various examples, currently available heavy trucks or tractor units have a readily available, off the shelf solution for fuel tank design and mounting. In general, the existing solutions are inexpensive, may be OEM-supplied, and have gone through relevant testing and qualification processes. Thus, in various cases, the risk of impact to a vehicle warranty is reduced. Standard fuel tanks are also available for trailers, and the embodiments disclosed herein may also be applied to energy store fuel tanks on a trailer.

In view of the above, embodiments of the energy store fuel tanks described herein may include one or more battery packs installed within a housing having a size and shape that is substantially the same as standard, available fuel tanks currently used in the trucking industry (e.g., such as cylindrical, rectangular, or D-shaped. In some examples, the diameter of the energy store fuel tank described herein may be the same as the diameter of at least some existing fuel tanks. Generally, dimensions of the energy store fuel tanks disclosed herein may be substantially the same as dimensions of at least some existing fuel tanks. As such, the energy store fuel tanks disclosed herein may be readily installed into tractors and/or trailers, which are already configured mount similarly sized fuel tanks. Additionally, in some embodiments, an existing fuel tank may be retrofitted to include one or more battery packs installed therein, so as to provide an energy store fuel tank. In yet other embodiments, the energy store fuel tank may be installed in a space adjacent to an existing fuel tank.

Figure 3A:
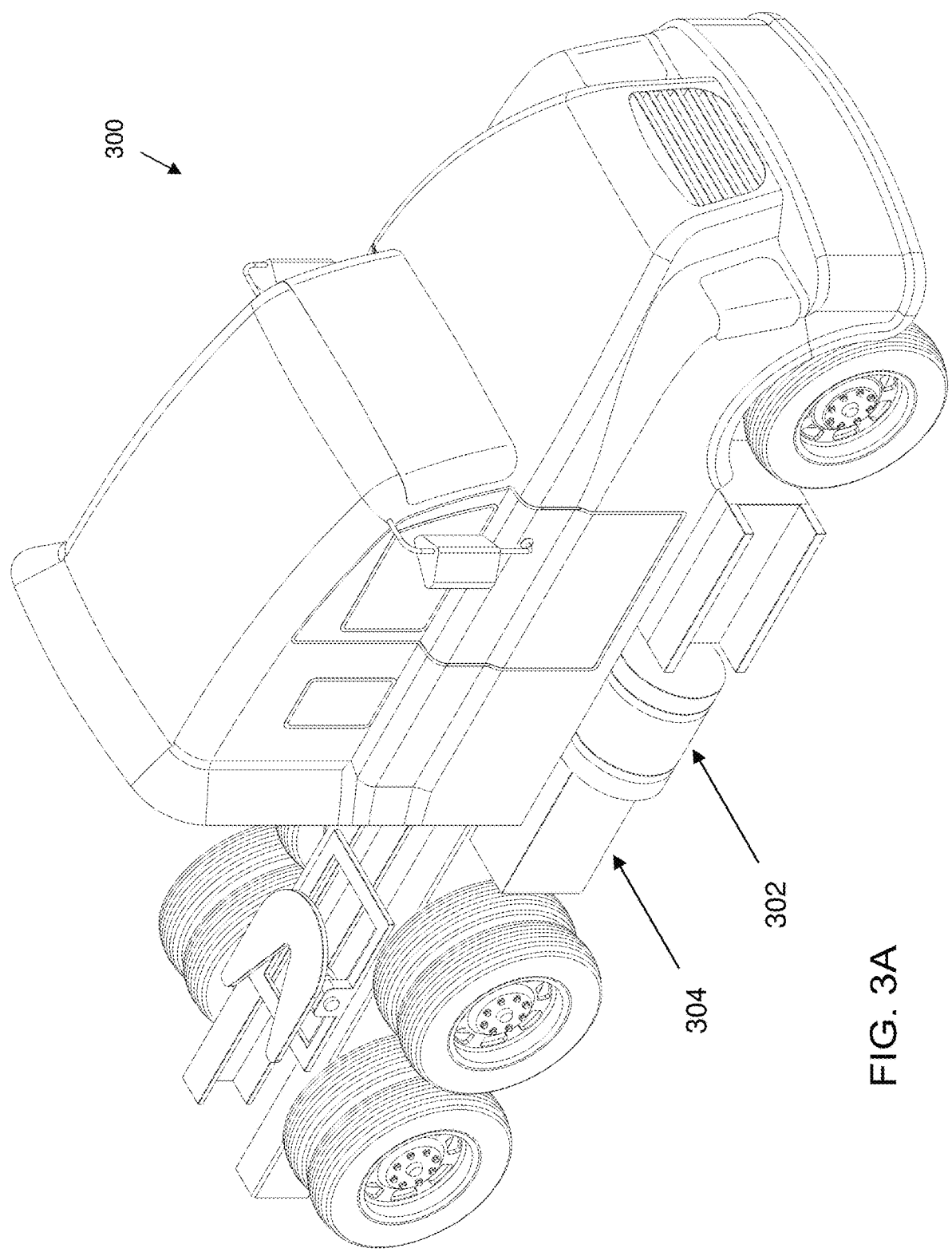
FIG. 3A illustrates a first view of a heavy truck or tractor unit including both a diesel or alternative fuel tank and an energy store fuel tank, in accordance with some embodiments.
Figure 3B:
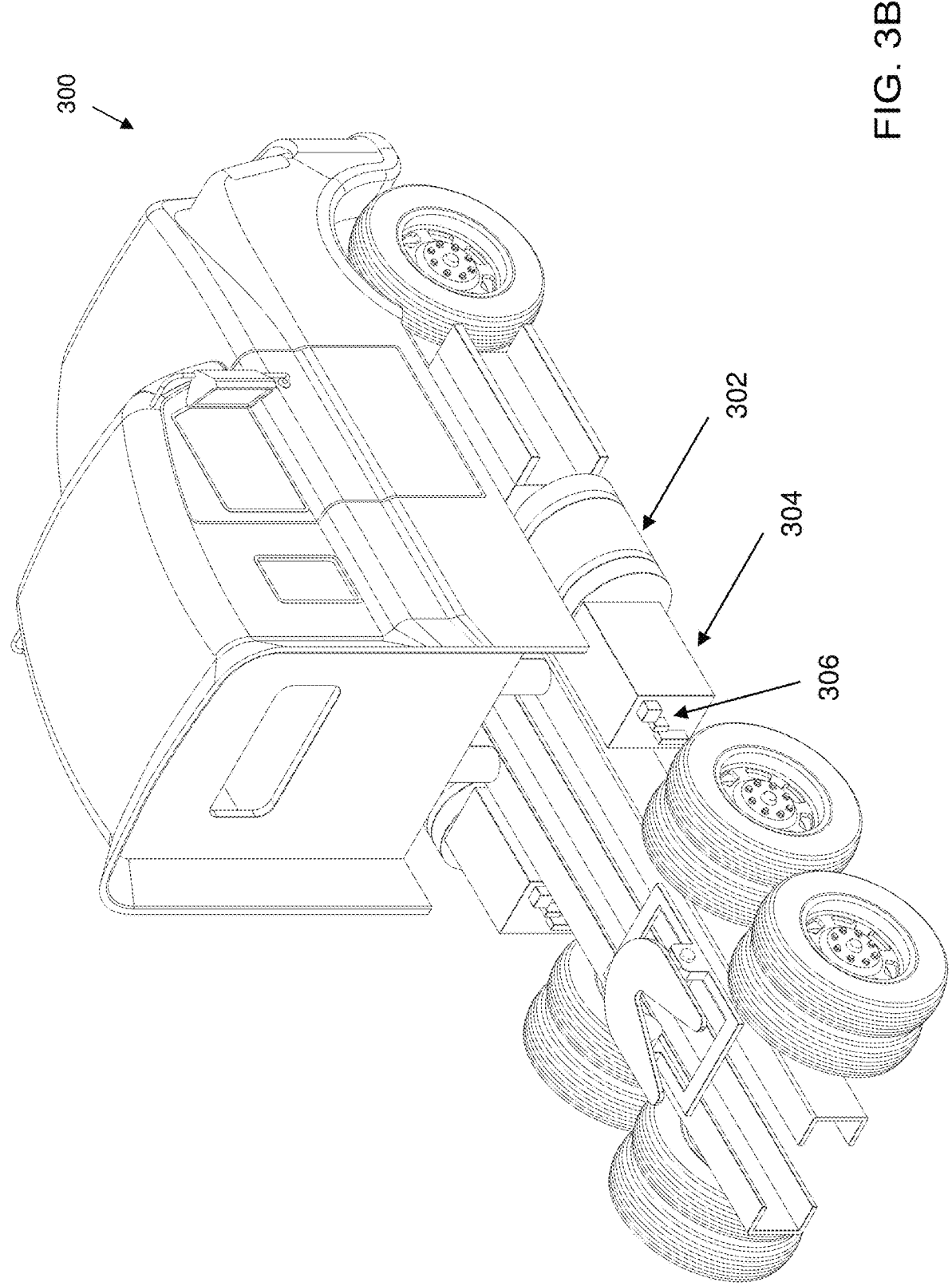
FIG. 3B illustrates a second view of a heavy truck or tractor unit including both a diesel or alternative fuel tank and an energy store fuel tank, in accordance with some embodiments.

For instance, FIG. 3A illustrates a first view of a heavy truck or tractor unit 300 including both a standard fuel tank 302 and an energy store fuel tank 304 installed adjacent to the standard fuel tank 302. In various examples, the standard fuel tank 302 may have different volumes according to specific requirements, such as for example 60 gallons, 80 gallons, 126 gallons, or another appropriate configuration. By way of example, the standard fuel tank 302 may be used as a diesel fuel tank, or a fuel tank for another type of fuel (e.g., propane, biodiesel, E85, etc.). In some embodiments, the energy store fuel tank 304 may include one or more battery packs installed therein, as described above. FIG. 3B illustrates a second view of the heavy truck or tractor unit 300 including the standard fuel tank 302 and the energy store fuel tank 304. This second view further illustrates electrical and hydraulic connections 306 coupled to the energy store fuel tank 304. It will be understood that the configuration of the tractor unit 300 is merely exemplary, and other configurations are possible without departing from the scope of the present disclosure. For example, while the standard fuel tank 302 is shown as having a cylindrical shape and the energy store fuel tank 304 is shown as having a rectangular shape, either or both of the standard fuel tank 302 and the energy store fuel tank 304 may have a cylindrical shape, a rectangular shape, or a D-shape. Also, while the standard fuel tank 302 is positioned closer to a front portion of the tractor unit 300 as compared to the energy store fuel tank 304, in other embodiments, the positions of the standard fuel tank 302 and the energy store fuel tank 304 may be swapped. In some examples, the energy store fuel tank 304 is positioned so as to be adjacent or proximate to, and supply electrical power to, the AHED unit or control system 150, described above.

Referring now to FIGS. 4 and 5, illustrated therein are side views of energy store fuel tanks 400 and 500, respectively, which include electrical and hydraulic connections. The energy store fuel tank 400 is illustrated as having a rectangular shape, and the energy store fuel tank 500 is illustrated as having a cylindrical shape; however, other embodiments are possible, as described above. In various embodiments, the energy store fuel tanks 400, 500 include hydraulic connections 402, 404, which may include a plurality of coolant fittings, to provide for liquid or air cooling of the energy store fuel tanks 400, 500. In some embodiments, the hydraulic connections 402, 404 include a hot side outlet and a cold side inlet. In some embodiments, the energy store fuel tanks 400, 500 also include a high voltage connection(s) 406 and a low voltage connection(s) 408 for receiving, storing, and providing electrical energy to a vehicle, where such electrical energy may be used for various purposes such as providing energy to an electrically powered axle, to provide an APU, or for any of a variety of other uses, some of which are described above. In at least some embodiments, the energy store fuel tanks disclosed herein may be used as the battery array 140, described above. In some cases, the energy store fuel tank may be used to supplement or replace the battery array 140.

With reference to FIGS. 6 and 7, illustrated therein are exemplary energy store fuel tanks 600 and 700, respectively, which include a common wall to separate the energy store fuel tanks into a first portion and a second portion. The energy store fuel tank 600 is illustrated as having a rectangular shape, and the energy store fuel tank 700 is illustrated as having a cylindrical shape; however, as previously noted, other embodiments are possible. In various embodiments, the energy store fuel tanks 600, 700 include a single, physically continuous body having a common wall 602 that physically separates a first portion 604 (e.g., electric portion) from a second portion 606 (e.g., diesel or alternative fuel portion). Thus, in some embodiments, the first portion 604 may include one or more battery packs installed therein, and the second portion 606 may include diesel fuel or other type of fuel (e.g., propane, biodiesel, E85, etc.) In some cases, the common wall 602 may include a bolted, separable connection. In some embodiments, the common wall 602 may be fabricated as an integral portion (non-separable) of the energy store fuel tanks 600, 700. In some cases, the common wall energy store fuel tanks 600, 700 may be a one-to-one substitution (e.g., in terms of size/shape) of an existing fuel tank, simplifying the installation process. Generally, and in various embodiments, components of the energy store fuel tanks described herein are readily interchangeable with components found on at least some existing heavy trucks or tractor units (e.g., such as a class 6, 7, or 8 truck).

Figure 8:
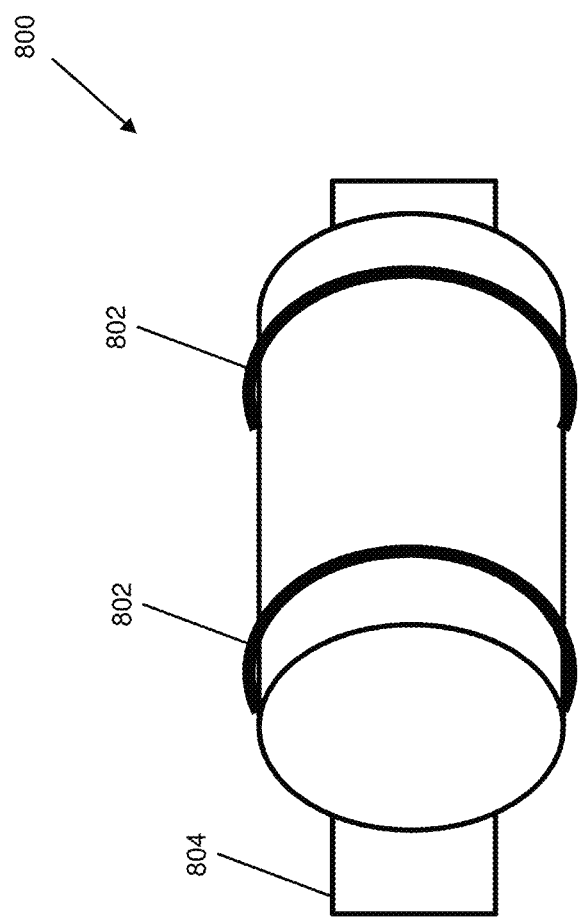
FIG. 8 illustrates an exemplary energy store fuel tank, including mounting brackets configured to secure the energy store fuel tank to a vehicle frame, in accordance with some embodiments.

Referring to FIG. 8, illustrated therein is an exemplary energy store fuel tank 800, including mounting brackets 802 configured to secure the energy store fuel tank 800 to a vehicle frame 804. In various examples, the mounting brackets 802 may include brackets or straps made of steel, stainless steel, aluminum, or other suitable material. In some cases, the mounting brackets 802 may also include other components such as clamps, mounts, steps, or other features. In particular, the mounting brackets 802 may be the same mounting brackets used to secure a standard fuel tank (e.g., such as the standard fuel tank 302). Thus, a standard fuel tank may easily be swapped out for an energy store fuel tank by simply un-securing the mounting brackets 802, removing the standard fuel tank, installing the energy store fuel tank, and re-securing the energy store fuel tank using the same mounting brackets 802. In some cases, rather than having to swap out the standard fuel tank, an energy store fuel tank may initially be installed in a tractor-trailer vehicle, still using the standard mounting brackets 802.

Figure 9:
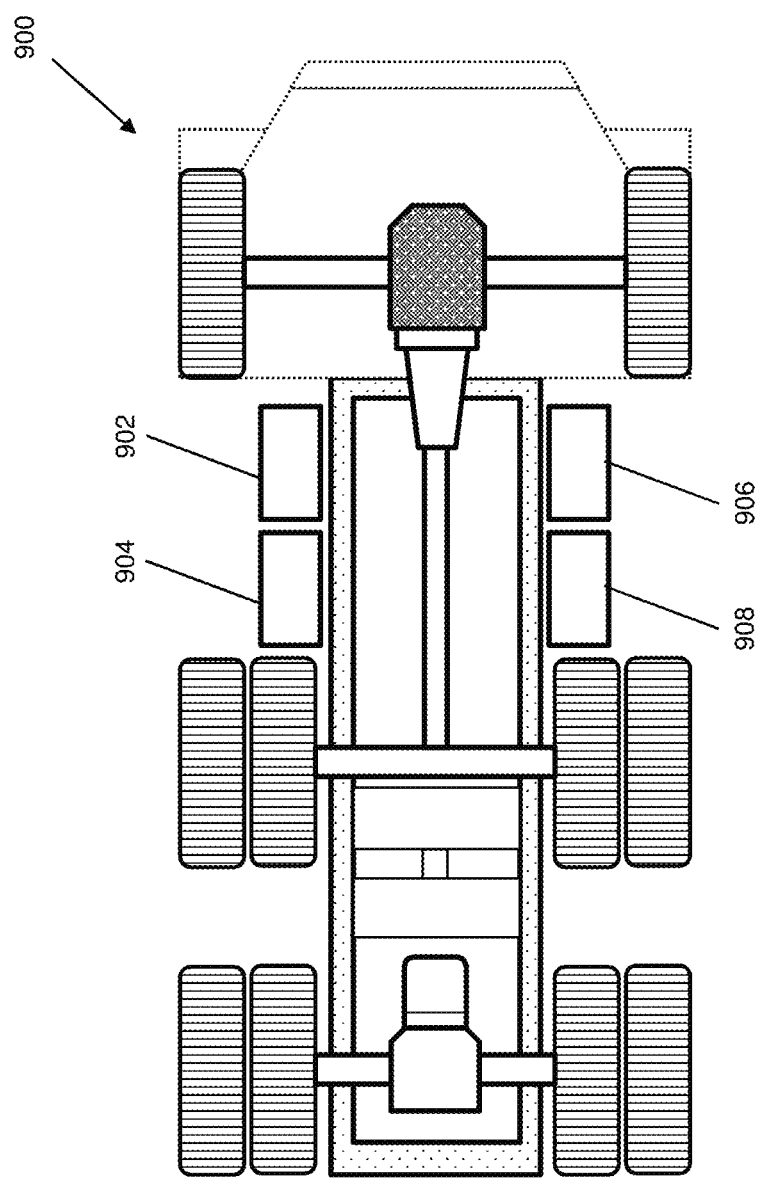
FIG. 9 illustrates a heavy truck or tractor unit including both a diesel or alternative fuel tank and an energy store fuel tank, mounted on lateral sides of the heavy truck or tractor unit, in accordance with some embodiments.
Figure 10:
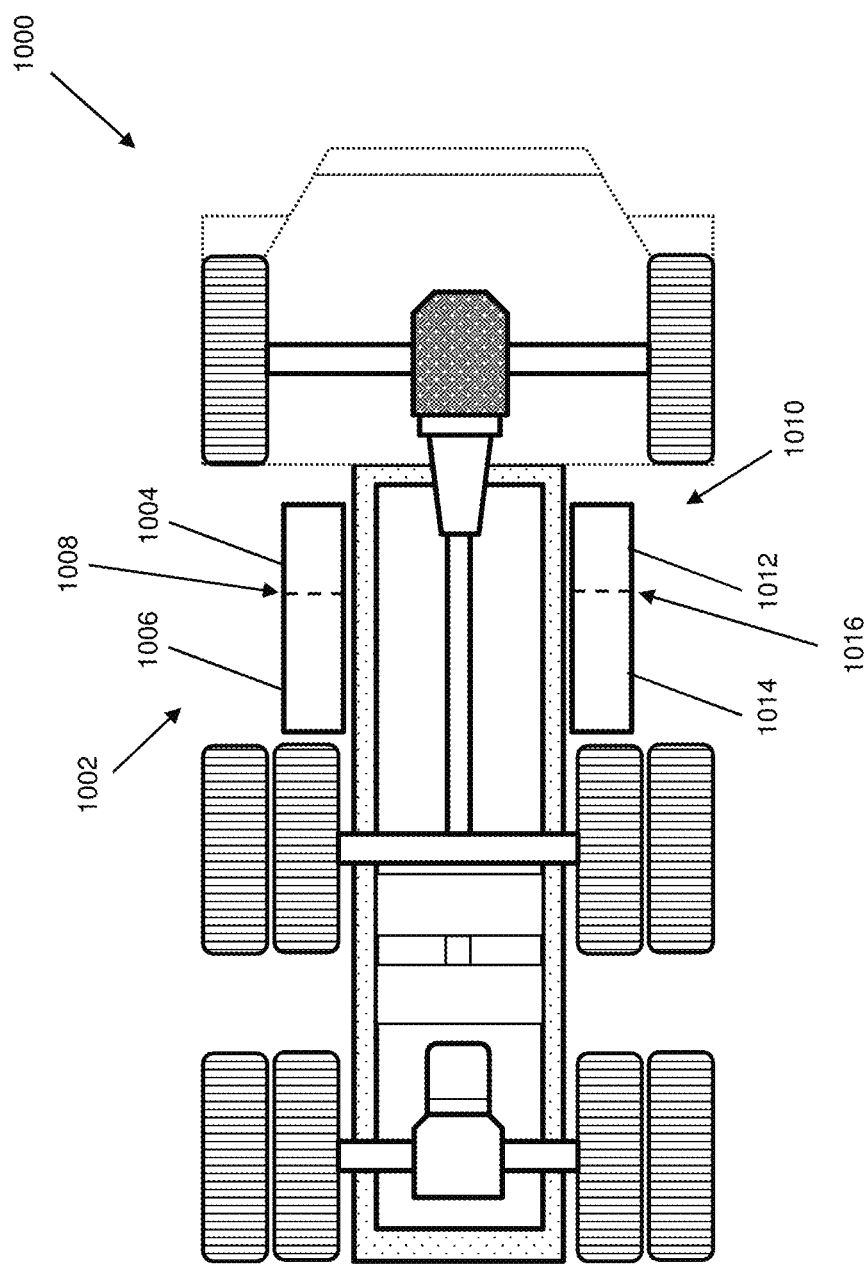
FIG. 10 illustrates a heavy truck or tractor unit including energy store fuel tanks having a common wall, mounted on lateral sides of the heavy truck or tractor unit, in accordance with some embodiments.
Figure 11:
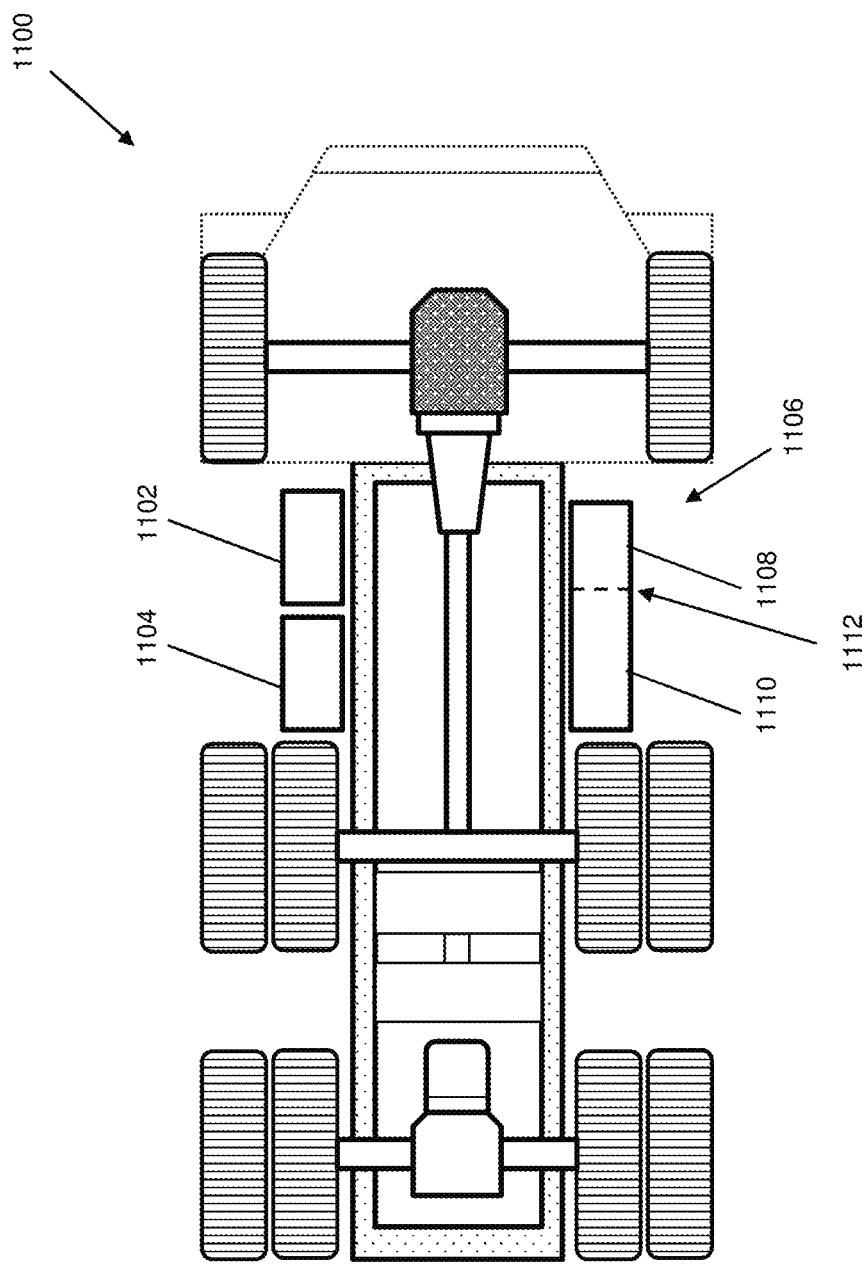
FIG. 11 illustrates a heavy truck or tractor unit including a diesel or alternative fuel tank and an energy store fuel tank mounted on a first lateral side of the heavy truck or tractor unit, and an energy store fuel tank having a common wall mounted on a second lateral side of the heavy truck or tractor unit, in accordance with some embodiments.

With reference to FIGS. 9-11, illustrated therein are additional embodiments of heavy trucks or tractor units including an energy store fuel tank. For example, FIG. 9 illustrates a heavy truck or tractor unit 900 including fuel tanks 902, 904, 906, 908 mounted on lateral sides of the heavy truck or tractor unit 900. In some embodiments, the number of standard fuel tanks and energy store fuel tanks is the same. For instance, the fuel tanks 902, 906 may include standard fuel tanks (e.g., diesel or alternative fuel tanks) and the fuel tanks 904, 908 may include energy store fuel tanks. In some examples, the number standard fuel tanks may be different than the number of energy store fuel tanks. For example, the fuel tanks 902, 904, 906 may include standard fuel tanks (e.g., diesel or alternative fuel tanks) and the fuel tank 908 may include an energy store fuel tank. Alternatively, the fuel tanks 902, 904, 906 may include energy store fuel tanks and the fuel tank 908 may include a standard fuel tank (e.g., diesel or alternative fuel tanks).

FIG. 10 illustrates a heavy truck or tractor unit 1000 including fuel tanks 1002, 1010 mounted on lateral sides of the heavy truck or tractor unit 1000. In some embodiments, the fuel tank 1002 includes a single, physically continuous body having a common wall 1008 that physically separates a first portion 1004 (e.g., electric portion) from a second portion 1006 (e.g., diesel or alternative fuel portion). Similarly, the fuel tank 1010 includes a single, physically continuous body having a common wall 1016 that physically separates a first portion 1012 (e.g., electric portion) from a second portion 1014 (e.g., diesel or alternative fuel portion). Thus, in some embodiments, the first portions 1004, 1012 may include one or more battery packs installed therein, and the second portions 1006, 1014 may include diesel fuel or other type of fuel (e.g., propane, biodiesel, E85, etc.).

FIG. 11 illustrates a heavy truck or tractor unit 1100 including fuel tanks 1102, 1104 mounted on a first lateral side of the tractor unit 1100, and a fuel tank 1106 mounted on a second lateral side of the tractor unit 1100. In various embodiments, the fuel tanks 1102, 1104 both include standard fuel tanks (e.g., diesel or alternative fuel tanks), the fuel tanks 1102, 1104 both include energy store fuel tanks, or the fuel tank 1102 includes a standard fuel tank and the fuel tank 1104 includes an energy store fuel tank. In some cases, the fuel tank 1106 includes a single, physically continuous body having a common wall 1112 that physically separates a first portion 1108 (e.g., electric portion) from a second portion 1110 (e.g., diesel or alternative fuel portion). Thus, the first portion 1108 may include one or more battery packs installed therein, and the second portion 1110 may include diesel fuel or other type of fuel (e.g., propane, biodiesel, E85, etc.). With respect to FIGS. 9-11, while some exemplary fuel tank configurations have been shown and described, it will be understood that other configurations are possible, without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A system comprising:
    a vehicle including a communication interface coupled to a network, the communication interface configured to communicate with a remote transceiver; and
    an energy store on the vehicle, the energy store configured to supply electrical power to the communication interface;
    wherein the energy store comprises:
        a tank housing mounted to a frame of the vehicle by a mounting bracket coupled to the frame, wherein the mounting bracket extends around, and in contact with, a circumference of the tank housing to secure the tank to the frame;
        a battery pack disposed within the tank housing; and
        an electrical interface through which the battery pack supplies the electrical power to the communication interface.

2. The system of claim 1,
    wherein the battery pack is configured to supply electrical power to the vehicle in a first mode of operation and further configured to receive energy from the vehicle in a second mode of operation.

3. The system of claim 1,
    wherein the electrical interface includes at least one high voltage connection and at least one low voltage connection; and
    wherein the tank housing includes a plurality of coolant ports configured to provide for a flow of a coolant through the tank housing to cool the battery pack.

4. The system of claim 1,
    wherein the tank housing includes a common wall configured to physically separate the tank housing into a first portion and a second portion,
    wherein the first portion includes the battery pack; and
    wherein the second portion includes a diesel or alternative fuel portion.

5. The system of claim 1,
    wherein the vehicle includes a tractor-trailer vehicle.

6. The system of claim 5,
    wherein a trailer portion of the tractor-trailer vehicle includes an electrically powered drive axle configured to supply supplemental torque to one or more wheels of the trailer portion and to thereby supplement, while the trailer portion travels over a roadway and in at least some modes of operation, primary motive forces applied through a separate drivetrain powered by a fuel-fed engine of a tractor portion of the tractor-trailer vehicle; and
    wherein the energy store is configured to supply the electrically powered drive axle with electrical power in the first mode of operation and is further configured to receive energy recovered using the electrically powered drive axle in the second mode of operation.

7. The system of claim 1,
wherein the energy store is configured to supply electrical power to an auxiliary power unit (APU) on the vehicle.

8. The system of claim 1, further comprising:
a diesel or alternative fuel tank mounted adjacent to, and on a same side of the vehicle as, the tank housing of the energy store.

9. The system of claim 1, wherein the energy store comprises:
a first tank adapted for mounting to a frame of the tractor-trailer vehicle by a first mounting bracket, wherein the first mounting bracket is coupled to the frame, and wherein the first mounting bracket extends around, and in contact with, a circumference of the first tank to secure the first tank to the frame; and
an energy store disposed within the first tank, the energy store configured to supply electrical power to the tractor-trailer vehicle in a first mode of operation and further configured to receive energy from the tractor-trailer vehicle in a second mode of operation;
wherein the first tank includes an electrical interface through which the energy store supplies the electrical power to the tractor-trailer vehicle in the first mode of operation and through which the energy store receives energy from the tractor-trailer vehicle in the second mode of operation.

10. The system of claim 1, wherein the energy store tank assembly defines a substantially D-shaped housing.

11. The system of claim 1, wherein the electrical interface includes at least one high voltage connection and at least one low voltage connection.

12. The system of claim 1, further comprising a plurality of coolant ports configured to provide for a flow of a coolant through the energy store tank assembly.

13. The system of claim 12, wherein the coolant includes a liquid coolant or an air coolant.

14. The system of claim 1, further comprising:
a second tank adapted for mounting to the frame of the tractor-trailer vehicle by a second mounting bracket, wherein the second mounting bracket is coupled to the frame, and wherein the second mounting bracket extends around, and in contact with, a circumference of the second tank to secure the second tank to the frame; wherein the second tank is mounted adjacent to, and on a same side of the tractor-trailer vehicle as, the first tank.

15. The system of claim 14, wherein the second tank includes a diesel or alternative fuel tank.

16. The system of claim 9, wherein
the first tank includes a common wall configured to physically separate the first tank into a first portion and a second portion,
the first portion includes the energy store; and
the second portion includes a diesel or alternative fuel portion.

17. The system of claim 9,
wherein the first tank is mounted to a first lateral side of the tractor-trailer vehicle, and
wherein the energy store tank assembly further comprises:
a second tank adapted for mounting to the frame of the tractor-trailer vehicle by a second mounting bracket, wherein the second mounting bracket is coupled to the frame, and
wherein the second mounting bracket extends around, and in contact with, a circumference of the second tank to secure the second tank to the frame; wherein the second tank is mounted to a second lateral side of the tractor-trailer vehicle opposite the first lateral side.

18. The system of claim 17, wherein the first tank includes a first common wall configured to physically separate the first tank into a first portion and a second portion,
wherein the second tank includes a second common wall configured to physically separate the second tank into a third portion and a fourth portion,
wherein the first portion includes the energy store;
wherein the second portion includes a first diesel or alternative fuel portion;
wherein the third portion includes another energy store; and
wherein the fourth portion includes a second diesel or alternative fuel portion.

19. The system of claim 9, wherein a trailer portion of the tractor-trailer vehicle includes an electrically powered drive axle configured to supply supplemental torque to one or more wheels of the trailer portion and to thereby supplement, while the trailer portion travels over a roadway and in at least some modes of operation, primary motive forces applied through a separate drivetrain powered by a fuel-fed engine of a tractor portion of the tractor-trailer vehicle;
wherein the energy store is configured to supply the electrically powered drive axle with electrical power in the first mode of operation and is further configured to receive energy recovered using the electrically powered drive axle in the second mode of operation.

20. The system of claim 9, wherein the energy store is configured to supply electrical power to an auxiliary power unit (APU) on the tractor-trailer vehicle.

* * * * *